(12) United States Patent
Chen et al.

(10) Patent No.: US 11,327,534 B2
(45) Date of Patent: May 10, 2022

(54) AXIS SHIFTING HINGE ASSEMBLIES

(71) Applicant: HEWLETT-PACKARD DEVELOPMENT COMPANY, L.P., Houston, TX (US)

(72) Inventors: Wei-Chung Chen, Taipei (CN); Kuan-Ting Wu, Taipei (CN); Kun-Hung Lin, Taipei (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 933 days.

(21) Appl. No.: 16/076,207

(22) PCT Filed: Feb. 6, 2017

(86) PCT No.: PCT/US2017/016627
§ 371 (c)(1),
(2) Date: Aug. 7, 2018

(87) PCT Pub. No.: WO2018/144025
PCT Pub. Date: Aug. 9, 2018

(65) Prior Publication Data
US 2021/0173448 A1    Jun. 10, 2021

(51) Int. Cl.
*G06F 1/16* (2006.01)
*E05D 3/02* (2006.01)

(52) U.S. Cl.
CPC .......... *G06F 1/1681* (2013.01); *G06F 1/1616* (2013.01); *E05D 3/02* (2013.01); *E05Y 2900/606* (2013.01)

(58) Field of Classification Search
CPC combination set(s) only.
See application file for complete search history.

(56) References Cited

U.S. PATENT DOCUMENTS

| | | |
|---|---|---|
| 5,201,902 A | 4/1993 | Baer |
| 6,859,980 B2 | 3/2005 | Baer |
| 7,621,020 B2 | 11/2009 | Hsu et al. |
| 8,687,354 B2 | 4/2014 | Uchiyama et al. |
| 8,776,319 B1 * | 7/2014 | Chang .................... G06F 1/1681 16/366 |
| 8,982,542 B2 * | 3/2015 | Bohn ..................... G06F 1/1681 361/679.06 |
| 9,009,919 B1 * | 4/2015 | Chiang ................. G06F 1/1681 16/366 |

(Continued)

FOREIGN PATENT DOCUMENTS

| | | |
|---|---|---|
| JP | 2011220397 A | 11/2011 |
| JP | 2012251572 A | 12/2012 |

*Primary Examiner* — Lisa Lea-Edmonds
(74) *Attorney, Agent, or Firm* — Global IP Services PLLC

(57) ABSTRACT

In one example, a hinge assembly is disclosed, which may include a first member and a second member rotatably connected to the first member through a mounting portion. The mounting portion may include a first surface having a first protrusion and a second surface, opposite the first surface, having a second protrusion. Further, the hinge assembly may include a first cam fixed to the first member and disposed adjacent to the first surface and a second cam fixed to the first member and disposed adjacent to the second surface. The first cam and second cam being engageable with the first protrusion and the second protrusion, respectively, to shift an axis of rotation of the second member.

14 Claims, 7 Drawing Sheets

(56) References Cited

U.S. PATENT DOCUMENTS

| | | | |
|---|---|---|---|
| 9,617,770 B1* | 4/2017 | Lin | E05D 3/122 |
| 2006/0185123 A1* | 8/2006 | Kuramochi | G06F 1/1681 |
| | | | 16/221 |
| 2008/0155784 A1* | 7/2008 | Hsu | H04M 1/0216 |
| | | | 16/303 |
| 2008/0263827 A1 | 10/2008 | Hsu et al. | |
| 2010/0077566 A1* | 4/2010 | Nishizawa | H04M 1/0222 |
| | | | 16/344 |
| 2010/0149764 A1* | 6/2010 | Ueyama | G06F 1/1683 |
| | | | 361/749 |
| 2010/0315773 A1* | 12/2010 | Senatori | H05K 5/0234 |
| | | | 361/679.55 |
| 2011/0047751 A1 | 3/2011 | Chen | |
| 2012/0192381 A1* | 8/2012 | Zhang | G06F 1/1681 |
| | | | 16/366 |
| 2012/0309470 A1* | 12/2012 | Park | G06F 1/1681 |
| | | | 455/575.3 |
| 2013/0014346 A1* | 1/2013 | Ahn | G06F 1/1681 |
| | | | 16/354 |
| 2013/0152342 A1* | 6/2013 | Ahn | F16C 11/04 |
| | | | 16/354 |
| 2013/0322004 A1* | 12/2013 | Park | G06F 1/1637 |
| | | | 361/679.27 |
| 2014/0290009 A1* | 10/2014 | Kasai | E05D 3/12 |
| | | | 16/386 |
| 2014/0340832 A1* | 11/2014 | Kwon | H04M 1/0216 |
| | | | 361/679.27 |
| 2015/0257289 A1* | 9/2015 | Lee | H05K 5/0226 |
| | | | 361/749 |
| 2016/0011631 A1 | 1/2016 | Lee et al. | |
| 2016/0034004 A1* | 2/2016 | Park | E05D 3/12 |
| | | | 16/330 |
| 2016/0062413 A1* | 3/2016 | Sano | E05D 11/10 |
| | | | 361/679.09 |
| 2016/0070310 A1* | 3/2016 | Holung | G06F 1/1681 |
| | | | 361/679.09 |
| 2016/0083988 A1* | 3/2016 | Hsu | G06F 1/1681 |
| | | | 361/679.01 |
| 2016/0302314 A1* | 10/2016 | Bae | G06F 1/16 |
| 2017/0115701 A1* | 4/2017 | Bae | G06F 1/16 |
| 2018/0067519 A1* | 3/2018 | Tazbaz | G06F 1/1637 |
| 2018/0087563 A1* | 3/2018 | Hsu | F16M 11/245 |
| 2018/0088634 A1* | 3/2018 | Bitz | H04M 1/0216 |
| 2018/0230724 A1* | 8/2018 | Lin | G06F 1/1616 |

\* cited by examiner

AXIS SHIFTING HINGE ASSEMBLIES

BACKGROUND

Electronic devices such as laptop computers, mobile phones, and the like may include a base portion, a cover portion, and a hinge mounted between the base portion and the cover portion. For example, the base portion may house a keyboard, a motherboard, and/or other components. The cover portion may house a display. The hinge may connect the cover portion to the base portion and allow the cover portion to rotate relative to the base portion.

BRIEF DESCRIPTION OF THE DRAWINGS

Examples are described in the following detailed description and in reference to the drawings, in which.

DETAILED DESCRIPTION

Hinged electronic devices, such as laptop computers and flip mobile phones, may include a base portion and a cover portion hinged about a pivot axis. In a closed position, the pivot axis is positioned even with the plane of contact between the base portion and the cover portion. Because of this geometry, the cover portion and the base portion cannot open 180° (e.g., as the cover portion (e.g., hinge up) may interfere with the base portion) and/or the hinge may protrude upward out of the plane.

Examples described herein may provide a hinge assembly for electronic devices. The hinge assembly may include a first member and a second member rotatably connected to the first member through a mounting portion. The mounting portion may include a first surface having a first protrusion and a second surface, opposite the first surface, having a second protrusion. The hinge assembly may include a first cam fixed to the first member and disposed adjacent to the first surface and a second cam fixed to the first member and disposed adjacent to the second surface. The first cam being engageable with the first protrusion to move the axis of rotation from a first position to a second position during opening of the second member. The second cam being engageable with the second protrusion to move the axis of rotation from the second position to the first position during closing of the second member.

Examples described herein may provide the hinge assembly with 180° axis of rotation. Examples described herein may avoid the interference/overlap between the cover portion and the base portion when rover portion opens to 180°, particularly, between 145° to 180°.

Figure 1:
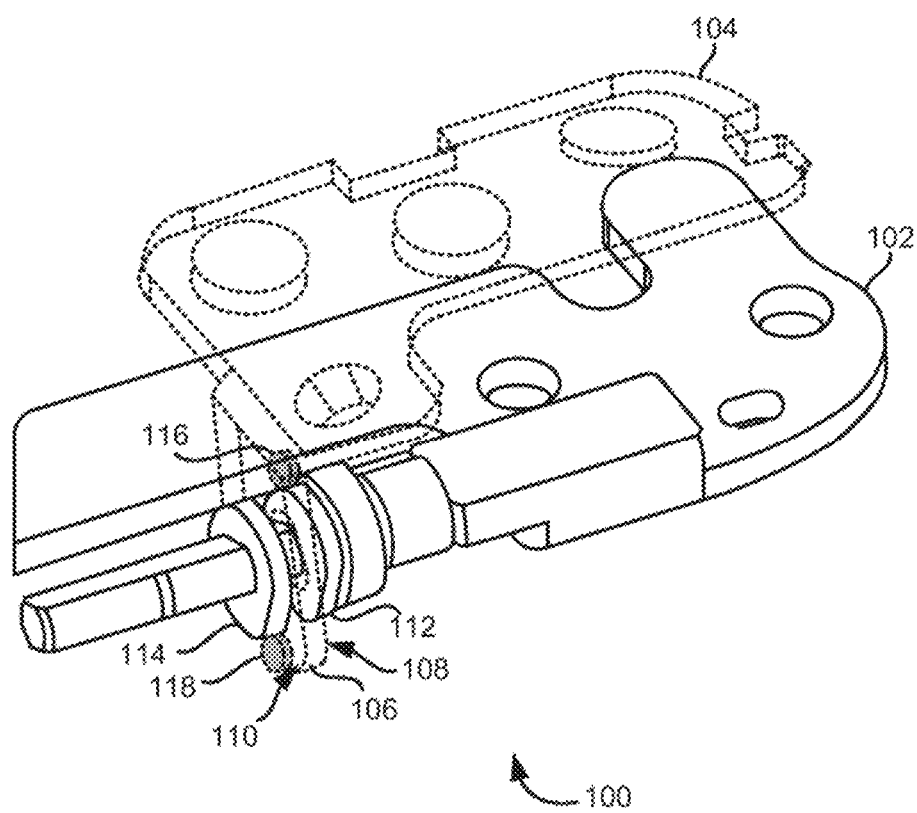
FIG. 1 is a perspective view of an example hinge assembly.

FIG. 1 is a perspective view of an example hinge assembly 100. Hinge assembly 100 may include a first member 102, a second member 104 rotatably connected to first member 102 through a mounting portion 106. Mounting portion 106 may include a first surface 108 having a first protrusion 116. Further, mounting portion 106 may include a second surface 110 opposite first surface 108 and having a second protrusion 118. In one example, first protrusion 116 may be formed at a top portion of first surface 108 and second protrusion 118 may be formed at a bottom portion of second surface 110. For example, first protrusion 116 and second protrusion 118 may be circular and cylindrical in shape.

Hinge assembly 100 may include a first cam 112 fixed to first member 102 and disposed adjacent to first surface 108. Also, hinge assembly 100 may include a second cam 114 fixed to first member 102 and disposed adjacent to second surface 110. In one example, first cam 112 and second cam 114 may have a non-uniform radius including a large diameter part and a small diameter part. First cam 112 and second cam 114 may be circular and include an oval exterior surface.

During operation, first cam 112 and second cam 114 may be engageable with first protrusion 116 and second protrusion 118, respectively, to shift an axis of rotation of second member 104. In one example, first cam 112 may abut and engage with first protrusion 116 to move/change the axis of rotation from a first position to a second position during opening of second member 104. In another example, second cam 114 may abut and engage with second protrusion 118 to move/change the axis of rotation from the second position to the first position (i.e., shifting the axis of rotation back to the original position in a folded state) during closing of second member 104.

Figure 2:
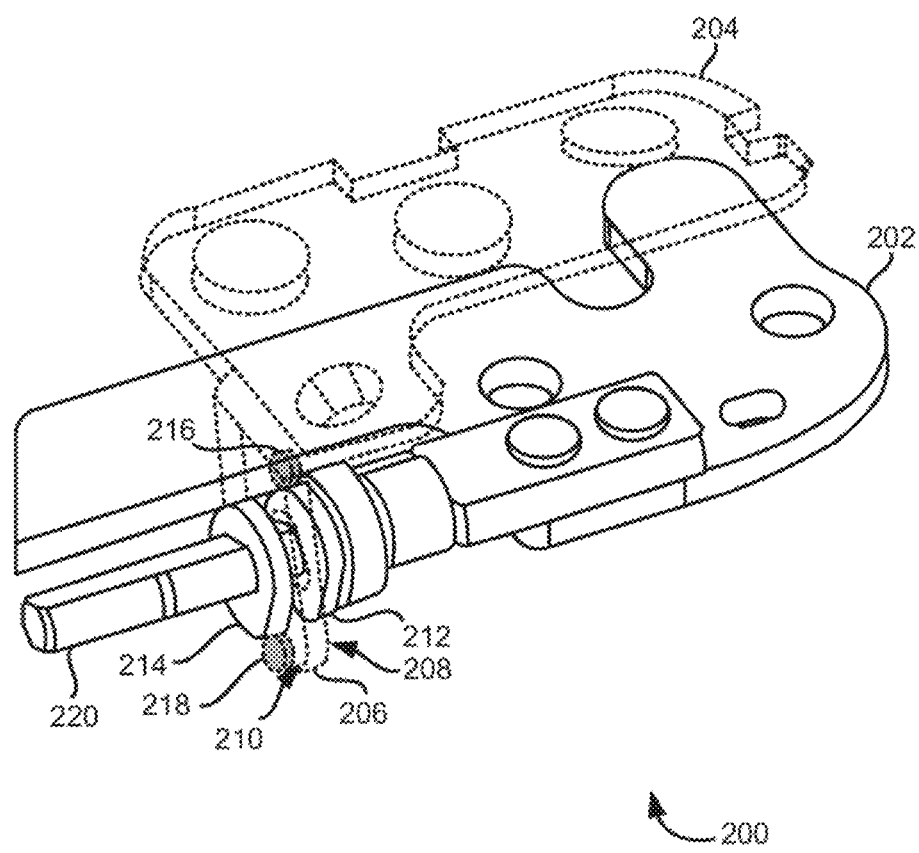
FIG. 2 is a perspective view of another example hinge assembly.

FIG. 2 is a perspective view of another example hinge assembly 200 for an electronic device. Hinge assembly 200 may include a shaft 220, a first member 202 mounted on shaft 220, and a second member 204 pivotable with respect to first member 202. In one example, shaft 220 may be fixedly coupled to first member 202. For example, shaft 220 may be fixed to first member 202 by means of a mounting flange. Second member 204 may include a mounting portion 206 rotatably mounted on shaft 220 such that second member 204 may pivot with respect to first member 202.

Mounting portion 206 may include a first surface 208 having a first protrusion 216. Further, mounting portion 206 may include a second surface 210 opposite first surface 208 and having a second protrusion 218. First protrusion 216 may be formed at a top portion of first surface 208 and second protrusion 218 may be formed at bottom portion of second surface 210.

Hinge assembly 200 may include a first cam 212 fixedly mounted on shaft 220 and disposed adjacent to first surface 208. Further, hinge assembly 200 may include a second cam 214 fixedly mounted on shaft 220 and disposed adjacent to second surface 210. First cam 212 and second cam 214 may include an oval exterior surface. For example, first cam 212 and second cam 214 may be fixedly coupled to shaft 220 such that the oval exterior surface may be disposed towards the bottom side.

First cam 212 and second cam 214 shift a longitudinal axis of hinge assembly 200 from a default first position to a second position and vice versa in response to a rotational movement of second member 204 as explained below.

During operation, first cam 212 may abut and engage with first protrusion 216 to move an axis of rotation from a first position to a second position (e.g., by outwardly moving second member 204) during opening of second member 204. In one example, first cam 212 may move the axis of rotation from the first position to the second position when an angle between first member 202 and second member 204 is in a range of 135° to 180° during opening of second member 204. Shifting the axis of rotation from the first position to the second position is explained in detail in FIG. 4A.

Further during operation, second cam 214 may abut and engage with second protrusion 218 to move the axis of rotation from the second position to the first position (e.g., by inwardly moving second member 204) during closing of second member 204. In one example, second cam 214 may move the axis of rotation from the second position to the first position when the angle between first member 202 and second member 204 is in a range of 0° to 90° during closing of second member 204. Shifting the axis of rotation from the second position to the first position is explained in detail in FIG. 4B.

Figure 3A:
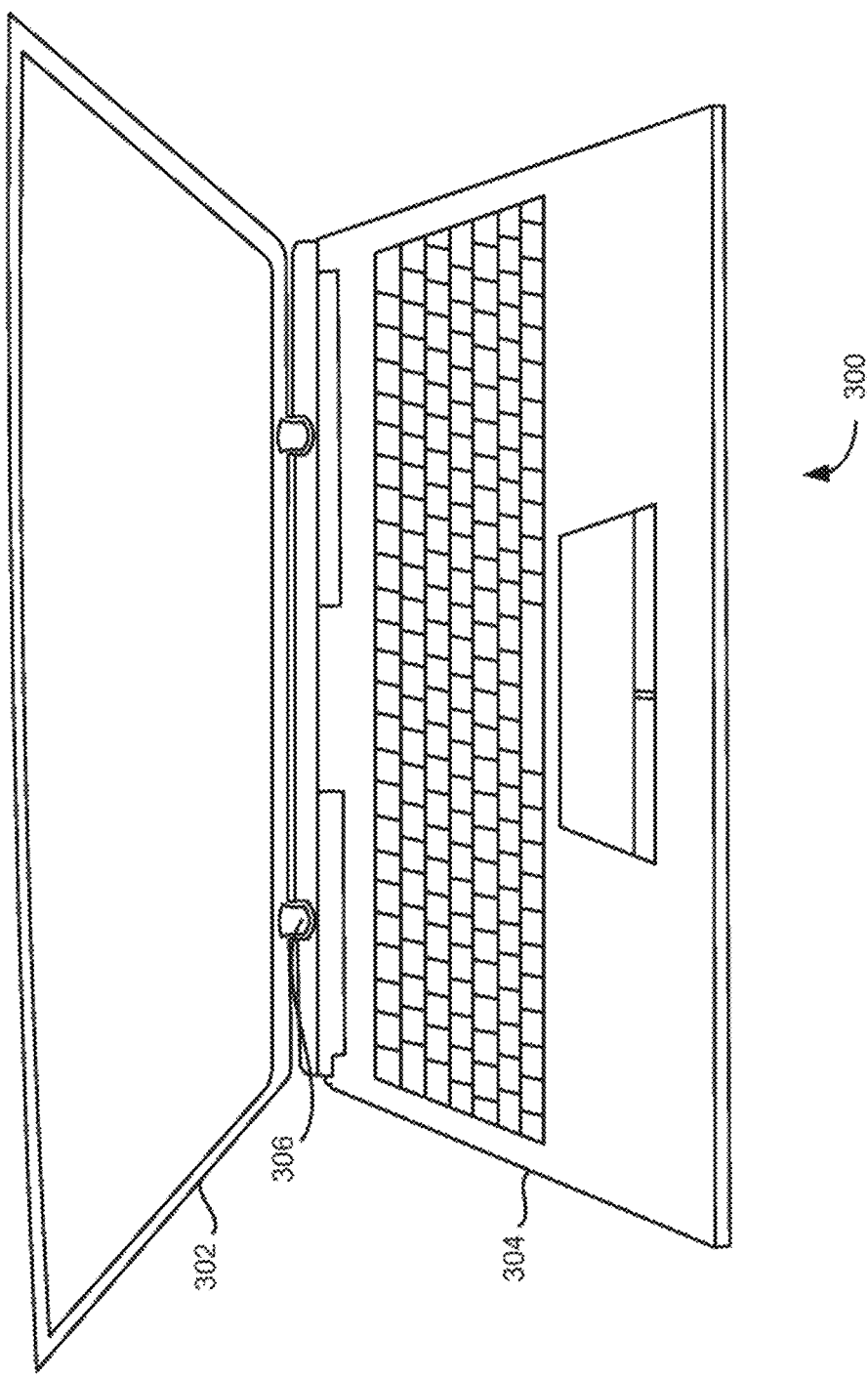
FIG. 3A is a perspective view of an example electronic device including the hinge assembly shown in FIGS. 1 and 2.

FIG. 3A is a perspective view of an example electronic device 300 including a hinge 306, such as hinge assembly 100 or 200 shown in FIGS. 1 and 2. Electronic device 300 may include a base portion 304 and a cover portion 302 connected to base portion 304 via hinge 306. Example electronic device 300 may be a computing system, for example, a laptop, a notebook, a sub-notebook, a mobile telephone, a personal gaming device, or other computing device with cover portion 302 closeable onto base portion 304. For example, base portion 304 may house a keyboard, a battery, a touchpad, and so on. Cover portion 302 may house a display. Hinge 306 may allow cover portion 302 (e.g., display housing) to rotate in directions about rotational axis relative to base portion 304.

Figure 3B:
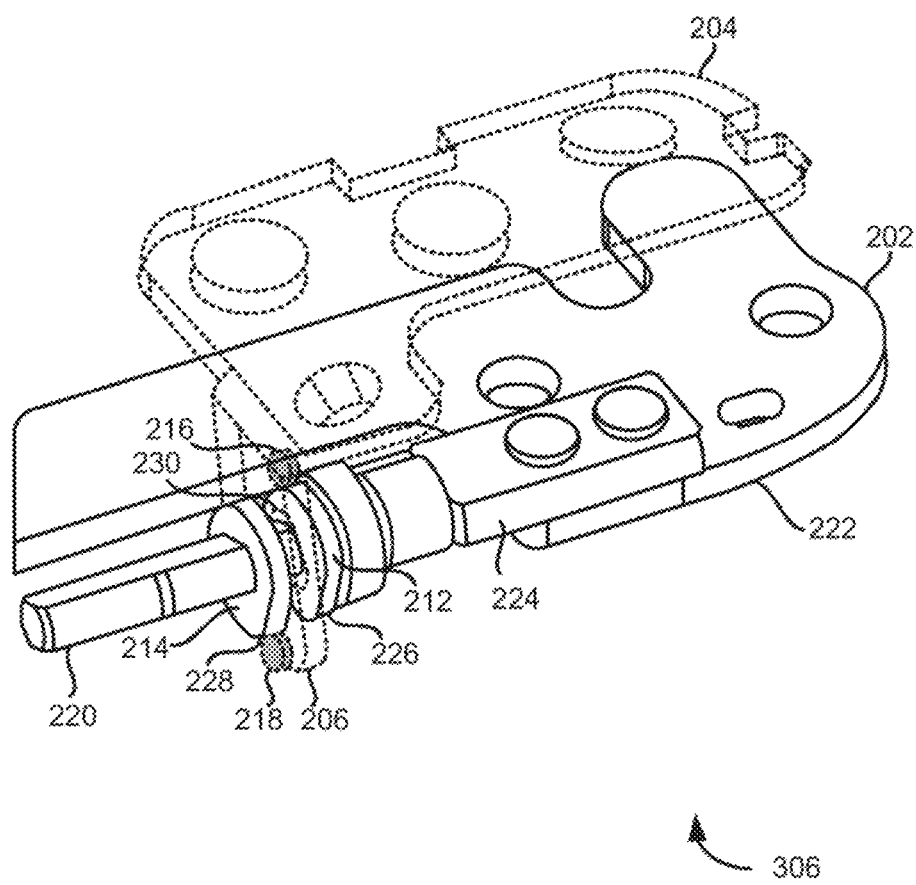
FIG. 3B is a perspective view of the example hinge assembly of FIG. 2, depicting additional features.

FIG. 3B is the perspective view of example hinge 306, such as hinge assembly 200 of FIG. 2 depicting additional features. Hinge 306 may include first member 202 and second member 204. In one example, first member including a main body 222 and shaft 220 may be made up of a single-piece structure as shown in FIG. 1. In this case, second member 204 may be rotatably mounted on first member 202 through mounting portion 206.

In another example, first member may be made up of a two-piece structure, one being main body 222 and other being shaft 220. In this case, shaft 220 may be connected to an end of main body 222. For example, shaft 220 may be fixed to main body 222 by means of a mounting flange 224. In this case, mounting portion 206 may be rotatably mounted on shaft 220. Further, mounting portion 206 may include a mounting hole 230 that is being formed through a center of mounting portion 206. For example, mounting hole 230 may be non-circular and mounted through by shaft 220 to allow axis shifting of second member 204 during rotation of cover portion 302.

Further, mounting portion 206 may include first surface 208 having first protrusion 216, and second surface 210 having second protrusion 218. First protrusion 216 may protrude from a top portion of first surface 208 and second protrusion 218 may protrude from a bottom portion of second surface 210. Hinge 306 may include first cam 212 fixed to first member 202/shaft 220 and disposed adjacent to first surface 208. Further, hinge 306 may include second cam 214 fixed to first member 202/shaft 220 and disposed adjacent to second surface 210. First cam 212 may include an oval exterior surface 226 and second cam 214 may include an oval exterior surface 228.

Each of first cam 212 and second cam 214 may include a through hole. Shaft 220 may be inserted into the through hole such that first cam 212 and second cam 214 may be disposed on either side of mounting portion 206. Further, first member 202 may be secured to base portion 304 and second member 204 may be secured to cover portion 302 such that cover portion 302 can be moved relative to base portion 304 in response to rotation of cover portion 302 about hinge 306.

During opening of cover portion 302, first cam 212 may abut and engage with first protrusion 216 to move the axis of rotation from a first position to a second position where cover portion 302 may not interfere with base portion 304. During closing of cover portion 302, second cam 214 may abut and engage with second protrusion 218 to move the axis of rotation from the second position to the first position. The operation of first cam 212 and second cam 214 with respect to first protrusion 216 and second protrusion 218 is explained in detail in FIGS. 4A and 4B.

Figure 4A:
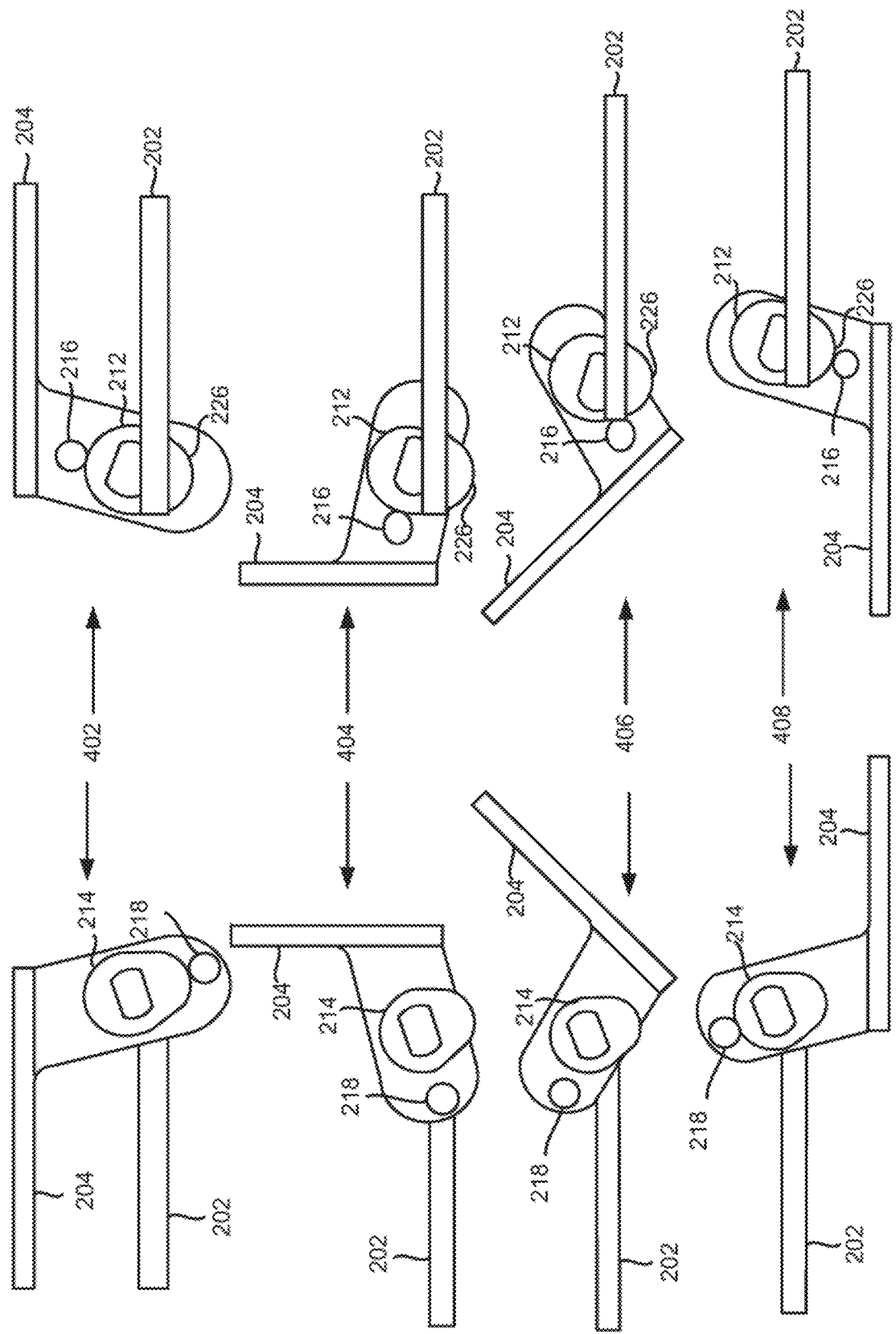
FIG. 4A is an example operation of a first cam that abuts and engages with a first protrusion to move an axis of rotation from a first position to a second position during opening of a second member.
Figure 4B:
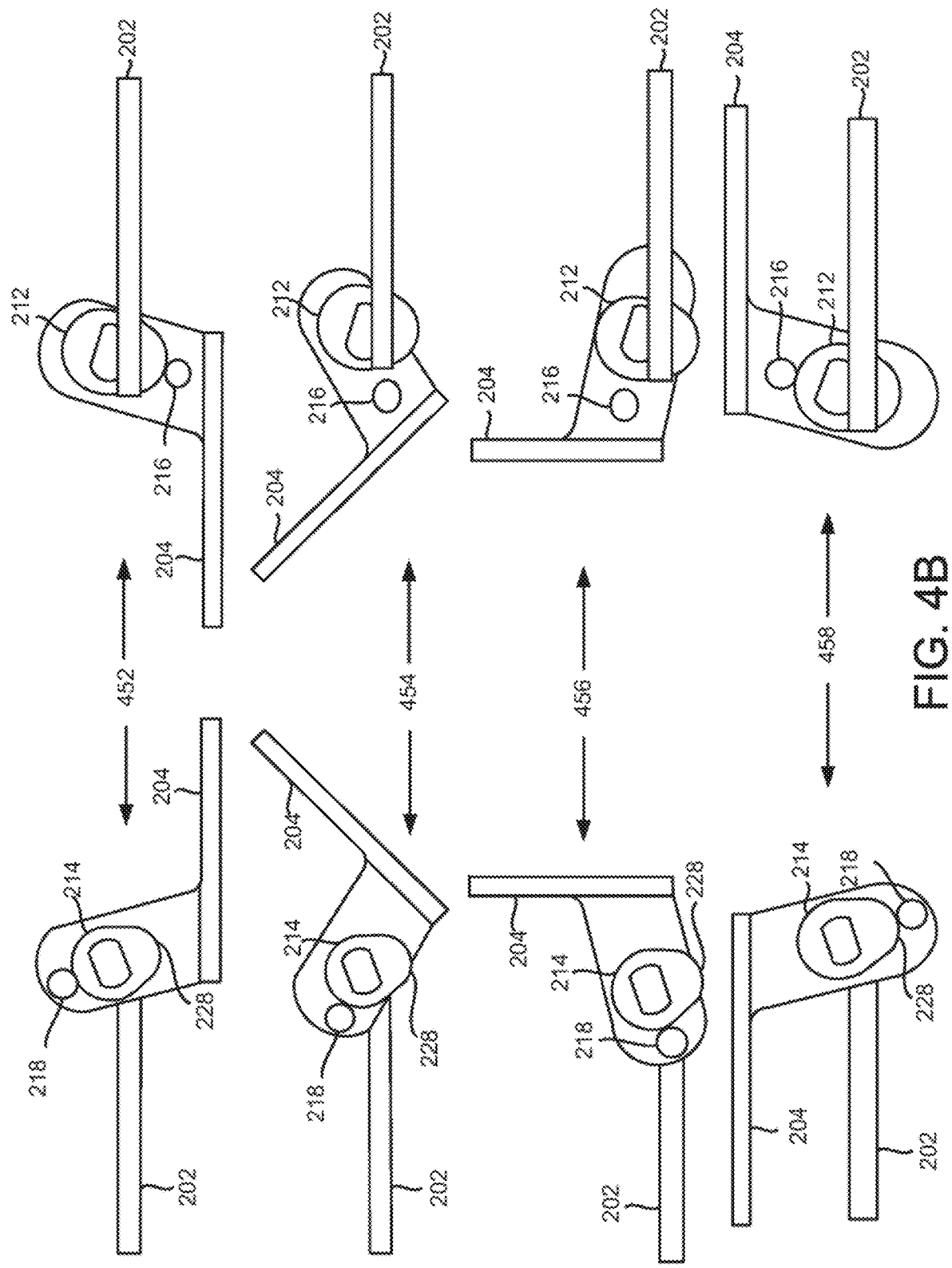
FIG. 4B is an example operation of a second cam that abuts and engages with a second protrusion to move the axis of rotation from the second position to the first position during closing of the second member.

FIG. 4A is an example operation of first cam 212 that abuts and engages with first protrusion 216 to move the axis of rotation from the first position to the second position during opening of second member 204. Particularly, FIGS. 4A and 4B depict positions of first protrusion 216 and second protrusion 218 with respect to first cam 212 and second cam 214 during opening and closing of second member 204. At 402, second member 204 is in a closed position. In the closed position, first protrusion 216 may be located on first surface 208 at a position opposite oval exterior surface 226 of first cam 212 and second protrusion 218 may be located on second surface 210 at a position physically engaging with oval exterior surface 228 of second cam 214.

Figure 5:
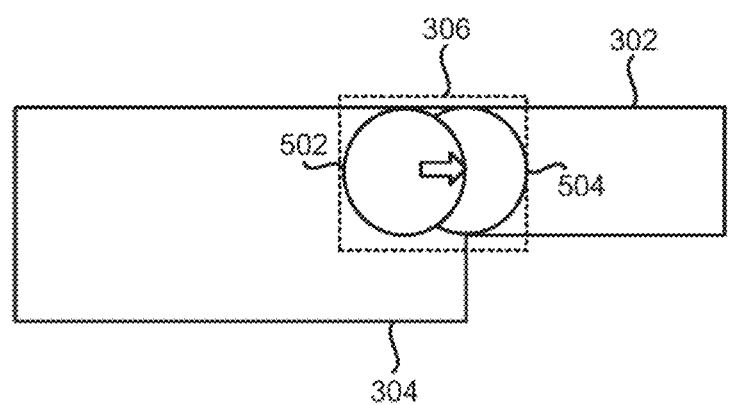
FIG. 5 is an example schematic depicting a shift in the axis of rotation of the second member during opening of the second member.

At 404, when second member 204 is opened from 0° to 90°, an outer perimeter of first protrusion 216 may abut and engage with an outer perimeter of first cam 212 with the axis of rotation in the first position. At 406, when second member 204 is opened from 90° to 135°, the outer perimeter of first protrusion 216 may abut and engage with the outer perimeter of first cam 212 with the axis of rotation in the first position. At 408, when second member 204 is opened from 135° to 180°, the outer perimeter of first protrusion 216 may abut and engage with oval exterior surface 226 of first cam 212 and hence move the axis of rotation from the first position to the second position (e.g., as shown in FIG. 5). In this case, first protrusion 216 may physically engage with large diameter portion of first cam 212 and hence shift the axis of rotation by outwardly moving second member 204. For example, as oval exterior surface 226 contacts first protrusion 216, first cam 212 may stay in place while the cam action of first cam 212 may drive cover portion 302 away from base portion 304.

FIG. 4B is an example operation of second cam 214 that abuts and engages with second protrusion 218 to move the axis of rotation from the second position to the first position during closing of second member 204. At 452, second member 204 is in 180° open position. At 454, when second member 204 is closed from 180° to 135°, an outer perimeter of second protrusion 218 may abut and engage with an outer perimeter of second cam 214 with the axis of rotation in the second position. At 456, when second member 204 is closed from 135° to 90°, the outer perimeter of second protrusion 218 may abut and engage with the outer perimeter of second cam 214 with the axis of rotation in the second position. At 458, when second member 204 is closed from 90° to 0°, the outer perimeter of second protrusion 218 may abut and engage with oval exterior surface 228 of second cam 214 and hence move the axis of rotation from the second position to the first position. In this case, second protrusion 218 may physically engage with large diameter portion of second cam 214 and hence move the axis of rotation back to the first position. For example, as oval exterior surface 228 contacts second protrusion 218, second cam 214 may stay in place while the cam action of second cam 214 may drive second member 204 to move from the second position to the first position.

FIG. 5 is an example schematic 500 depicting a shift in the axis of rotation of second member 204 during opening of second member 204. FIG. 5 depicts base portion 304, cover portion 302, and a hinge 306 connecting cover portion 302 to base portion 304. As shown in FIG. 5, when cover portion 302 is opened to 180°, the axis of rotation may be moved from a first position 502 to a second position 504 (e.g., in the direction indicated by an arrow) to avoid cover portion 302 interference with base portion 304.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, Modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on," as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A hinge assembly comprising:
   a first member, wherein the first member comprises a main body and a shaft connected to the main body;
   a second member rotatably connected to the first member through a mounting portion rotatably mounted on the shaft, wherein the mounting portion comprises:
   a first surface having a first protrusion; and
   a second surface opposite the first surface and having a second protrusion;
   a first cam fixed to the first member and disposed adjacent to the first surface; and
   a second cam fixed to the first member and disposed adjacent to the second surface, wherein the first cam and the second cam being engageable with the first protrusion and the second protrusion, respectively, to shift an axis of rotation of the second member.

2. The hinge assembly of claim 1, wherein the first cam being engageable with the first protrusion to move the axis of rotation from a first position to a second position during opening of the second member, and wherein the first cam comprises an oval exterior surface.

3. The hinge assembly of claim 2, wherein the second cam being engageable with the second protrusion to move the axis of rotation from the second position to the first position during closing of the second member, and wherein the second cam comprises an oval exterior surface.

4. The hinge assembly of claim 1, wherein the first protrusion is formed at a top portion of the first surface and the second protrusion is formed at a bottom portion of the second surface.

5. A hinge assembly comprising:
   a shaft;
   a first member mounted on the shaft;
   a second member pivotable with respect to the first member and including a mounting portion rotatably mounted on the shaft, wherein the mounting portion comprises:
   a first surface having a first protrusion; and
   a second surface opposite the first surface and having a second protrusion;
   a first cam fixed to the shaft and disposed adjacent to the first surface; and
   a second cam fixed to the shaft and disposed adjacent to the second surface, wherein the first cam and the second cam being engageable with the first protrusion and the second protrusion, respectively, to shift an axis of rotation of the second member.

6. The hinge assembly of claim 5, wherein the first cam being engageable with the first protrusion to move the axis of rotation from a first position to a second position during opening of the second member.

7. The hinge assembly of claim 6, wherein the first cam is to move the axis of rotation from the first position to the second position when an angle between the first member and the second member is in a range of 135° to 180° during opening of the second member, and wherein the first cam comprises an oval exterior surface.

8. The hinge assembly of claim 6, wherein the second cam being engageable with the second protrusion to move the axis of rotation from the second position to the first position during closing of the second member.

9. The hinge assembly of claim 8, wherein the second cam is to move the axis of rotation from the second position to the first position when an angle between the first member and the second member is in a range of 0° to 90° during closing of the second member, and wherein the second cam comprises an oval exterior surface.

10. The hinge assembly of claim 5, wherein the first protrusion protrudes from a top portion of the first surface and the second protrusion protrudes from a bottom portion of the second surface.

11. An electronic device comprising:
    a cover portion;
    a base portion; and
    a hinge connecting the cover portion to the base portion, wherein the hinge comprises:
    a first member, wherein the first member comprises a main body and a shaft connected to the main body;
    a second member rotatably connected to the first member through a mounting portion rotatably mounted on the shaft, wherein the mounting portion comprises:
    a first surface having a first protrusion; and
    a second surface opposite the first surface and having a second protrusion;
    a first cam fixed to the first member and disposed adjacent to the first surface; and a second cam fixed to the first member and disposed adjacent to the second surface, wherein the first cam and the second cam being engageable with the first protrusion and the second protrusion, respectively, to shift an axis of rotation of the second member.

12. The electronic device of claim 11, wherein the first member is connected to the base portion and the second member is connected to the cover portion such that the cover portion is moved relative to the base portion in response to rotation of the cover portion about the hinge.

13. The electronic device of claim 11, wherein the first cam being engageable with the first protrusion to move the axis of rotation from a first position to a second position where the cover portion does not interfere with the base portion during opening of the cover portion, and wherein the second cam being engageable with the second protrusion to move the axis of rotation from the second position to the first position during closing of the cover portion.

14. The electronic device of claim 11, wherein the first protrusion protrudes from a top portion of the first surface and the second protrusion protrudes from a bottom portion of the second surface.

* * * * *